US009562333B2

(12) United States Patent
Sandler et al.

(10) Patent No.: US 9,562,333 B2
(45) Date of Patent: Feb. 7, 2017

(54) SPREADER ASSEMBLY

(75) Inventors: Philip Sandler, Mayfield Village, OH (US); Michael J. Cowett, Solon, OH (US); Timothy Bunsey, Mayfield Heights, OH (US); Mathew Philpott, Chardon, OH (US)

(73) Assignee: Buyers Products Company, Mentor, OH (US)

(*) Notice: Subject to any disclaimer, the term of this patent is extended or adjusted under 35 U.S.C. 154(b) by 818 days.

(21) Appl. No.: 13/161,144

(22) Filed: Jun. 15, 2011

(65) Prior Publication Data

US 2011/0303769 A1 Dec. 15, 2011

Related U.S. Application Data

(63) Continuation of application No. 11/235,585, filed on Sep. 26, 2005, now abandoned.

(51) Int. Cl.

| | |
|---|---|
| ***A01C 19/00*** | (2006.01) |
| ***E01C 19/20*** | (2006.01) |
| ***A01C 3/06*** | (2006.01) |
| ***A01C 17/00*** | (2006.01) |
| *B05B 3/08* | (2006.01) |

(52) U.S. Cl.

CPC ........... *E01C 19/203* (2013.01); *E01C 19/204* (2013.01); *B05B 3/085* (2013.01); *E01C 2019/208* (2013.01); *E01C 2019/2075* (2013.01)

(58) Field of Classification Search

CPC .... E01C 19/203; E01C 19/204; E01C 19/208; E01C 19/2075; B05B 3/085

USPC ............... 239/672, 677, 675, 668, 676, 679, 669,239/650, 651, 661, 663, 687

See application file for complete search history.

(56) References Cited

U.S. PATENT DOCUMENTS

| | | | | | |
|---|---|---|---|---|---|
| 1,989,222 | A | * | 1/1935 | Acer et al. | 111/200 |
| 2,858,011 | A | * | 10/1958 | Wahl | 222/413 |
| 2,954,235 | A | * | 9/1960 | Parker | 239/658 |
| 3,220,740 | A | * | 11/1965 | Kavan et al. | 239/663 |
| 3,322,429 | A | * | 5/1967 | Cervelli | 239/670 |
| 3,414,200 | A | * | 12/1968 | Savory | 239/673 |
| 3,429,418 | A | * | 2/1969 | Fyrk | 239/656 |
| 3,559,894 | A | * | 2/1971 | Murray et al. | 239/672 |
| 3,768,737 | A | * | 10/1973 | Tobias | 239/666 |
| 3,819,120 | A | * | 6/1974 | Walker | 239/661 |
| 3,878,815 | A | * | 4/1975 | Gorius | 118/318 |
| 4,166,581 | A | * | 9/1979 | Hetrick | 239/683 |
| 4,169,559 | A | * | 10/1979 | McKee | 239/672 |
| 4,189,950 | A | * | 2/1980 | Killian | 74/89.38 |

(Continued)

*Primary Examiner* — Arthur O Hall
*Assistant Examiner* — Steven M Cernoch
(74) *Attorney, Agent, or Firm* — Renner, Otto, Boisselle & Sklar, LLP

(57) ABSTRACT

A spreader assembly for spreading sand or salt comprised of a molded, double-walled hopper having a bin portion and leg portions. The hopper has an inner wall and an outer wall, wherein the inner wall has a front end section and opposing side sections. The end sections and the side sections define a media-holding chamber within the bin portion of the hopper. The chamber has a generally rectangular upper portion, a funnel-shaped lower portion and a bottom having an opening extending through the bin portion. The funnel-shaped lower portion of the chamber slopes toward the opening. The outer wall of the hopper defines the leg portions, and the leg portions are dimensioned to extend below the opening in the bin portion.

16 Claims, 11 Drawing Sheets

(56) References Cited

U.S. PATENT DOCUMENTS

| | | | | |
|---|---|---|---|---|
| 4,350,303 | A * | 9/1982 | van der Lely | 239/673 |
| 4,363,447 | A * | 12/1982 | Schulze | 239/659 |
| 4,712,717 | A * | 12/1987 | Egerdahl | 239/661 |
| H001205 | H * | 7/1993 | Pearce et al. | 239/654 |
| 5,234,128 | A * | 8/1993 | Hill | 222/63 |
| 5,288,028 | A * | 2/1994 | Spivak et al. | 239/683 |
| 5,375,773 | A * | 12/1994 | Lewis | 239/650 |
| 5,485,963 | A * | 1/1996 | Walto et al. | 239/663 |
| 5,649,666 | A * | 7/1997 | Lewis | 239/657 |
| 5,927,617 | A * | 7/1999 | Musso et al. | 239/657 |
| 5,941,464 | A * | 8/1999 | Seymour | 239/675 |
| 5,988,534 | A * | 11/1999 | Kost et al. | 239/650 |
| 6,027,052 | A * | 2/2000 | Strieker et al. | 239/654 |
| 6,047,908 | A * | 4/2000 | Seymour et al. | 239/675 |
| 6,068,200 | A * | 5/2000 | Kime | 239/7 |
| 6,089,478 | A * | 7/2000 | Truan et al. | 239/675 |
| 6,145,709 | A * | 11/2000 | Hogan et al. | 222/278 |
| 6,220,532 | B1 * | 4/2001 | Manon et al. | 239/672 |
| 6,361,266 | B1 * | 3/2002 | Hagemeyer et al. | 414/528 |
| 6,398,137 | B1 * | 6/2002 | Manon et al. | 239/672 |
| 6,422,490 | B1 * | 7/2002 | Truan et al. | 239/659 |
| 6,446,879 | B1 * | 9/2002 | Kime | 239/7 |
| 6,722,590 | B2 * | 4/2004 | Kost et al. | 239/687 |
| 2002/0172582 | A1 * | 11/2002 | Feller | 414/489 |
| 2002/0179750 | A1 * | 12/2002 | Truan et al. | 239/679 |
| 2003/0006320 | A1 * | 1/2003 | Swift et al. | 239/675 |
| 2005/0184174 | A1 * | 8/2005 | Bailey et al. | 239/672 |

* cited by examiner

SPREADER ASSEMBLY

This application is a continuation of U.S. patent application Ser. No. 11/235,585, filed on Sep. 26, 2005 now abandoned, which is hereby incorporated by reference.

FIELD OF THE INVENTION

The present invention relates generally to a spreader assembly for spreading salt and sand, and more particularly, to a spreader assembly for mounting to a bed of a truck.

BACKGROUND OF THE INVENTION

Snow and ice control for parking areas around hospitals, shopping malls and industries is generally handled by private contractors or employees of such facilities who use a salt and sand spreader mounted to a vehicle. One type of spreader assembly is a "tailgate spreader." A tailgate spreader is a device having a hopper for holding the sand or salt and a spinner plate for distributing the same. The spreader is attached or mounted behind the tailgate of the vehicle, and is supported by the tailgate or the bumper of the vehicle. Such spreaders find advantageous use for most small commercial applications.

However, when the area to be controlled is relatively large, it is known to use spreader assemblies that include hoppers that rest within the bed of a conventional pick-up truck. Heretofore, such structures were relatively heavy and included an elongated hopper having a conveyor device within the hopper for conveying the sand or salt to a distributor.

The present invention provides an improved bed-mounted sand and salt spreader assembly for use on vehicles with flat beds.

SUMMARY OF THE INVENTION

In accordance with a preferred embodiment of the present invention, there is provided a material spreading apparatus for mounting in a cargo bay of a truck. The apparatus is comprised of a molded, seamless hopper having a front end and a back end. The hopper has an inner wall that slopes downwardly toward an opening in the bottom of the hopper. The hopper is further comprised of downwardly extending columnar leg portions for supporting the opening above a surface on which the hopper rests. An elongated conveyor device extends along the bottom of the hopper beneath the opening for conveying particulates from the opening toward the back end of the hopper. A spinner assembly is attached to the hopper at the back end and is disposed to receive particulates from the hopper and throw the material over a distribution area.

Another preferred embodiment of the present invention is a spreader assembly for spreading sand or salt comprised of a molded, double-walled hopper having a bin portion and leg portions. The hopper has an inner wall and an outer wall, wherein the inner wall has a front end section and opposing side sections. The end sections and the side sections define a media-holding chamber within the bin portion of the hopper. The chamber has a generally rectangular upper portion, a funnel-shaped lower portion and a bottom having an opening extending through the bin portion. The funnel-shaped lower portion of the chamber slopes toward the opening. The outer wall of the hopper defines the leg portions, and the leg portions are dimensioned to extend below the opening in the bin portion.

An advantage of the present invention is a sand and salt spreader assembly for mounting to the bed of a vehicle.

Another advantage of the present invention is a sand and salt spreader assembly as described above that is easily mounted to the vehicle, and easily removed therefrom.

Another advantage of the present invention is a sand and salt spreader assembly as described above that does not require alteration or modification of the vehicle.

Another advantage of the present invention is a sand and salt spreader assembly as described above that has a particulate conveyor device that is positioned outside of a hopper for holding the sand or salt.

Another advantage of the present invention is a sand and salt spreader assembly as described above having lifting means to facilitate mounting of the assembly onto the bed of a vehicle.

Another advantage of the present invention is a sand and salt spreader assembly as described above having a seamless, molded hopper for holding the sand and salt.

A still further advantage of the present invention is a sand and salt spreader assembly as described above having a double-walled hopper.

A still further advantage of the present invention is a sand and salt spreader assembly as described above having a detachable spinner assembly.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENTS

Figure 1:
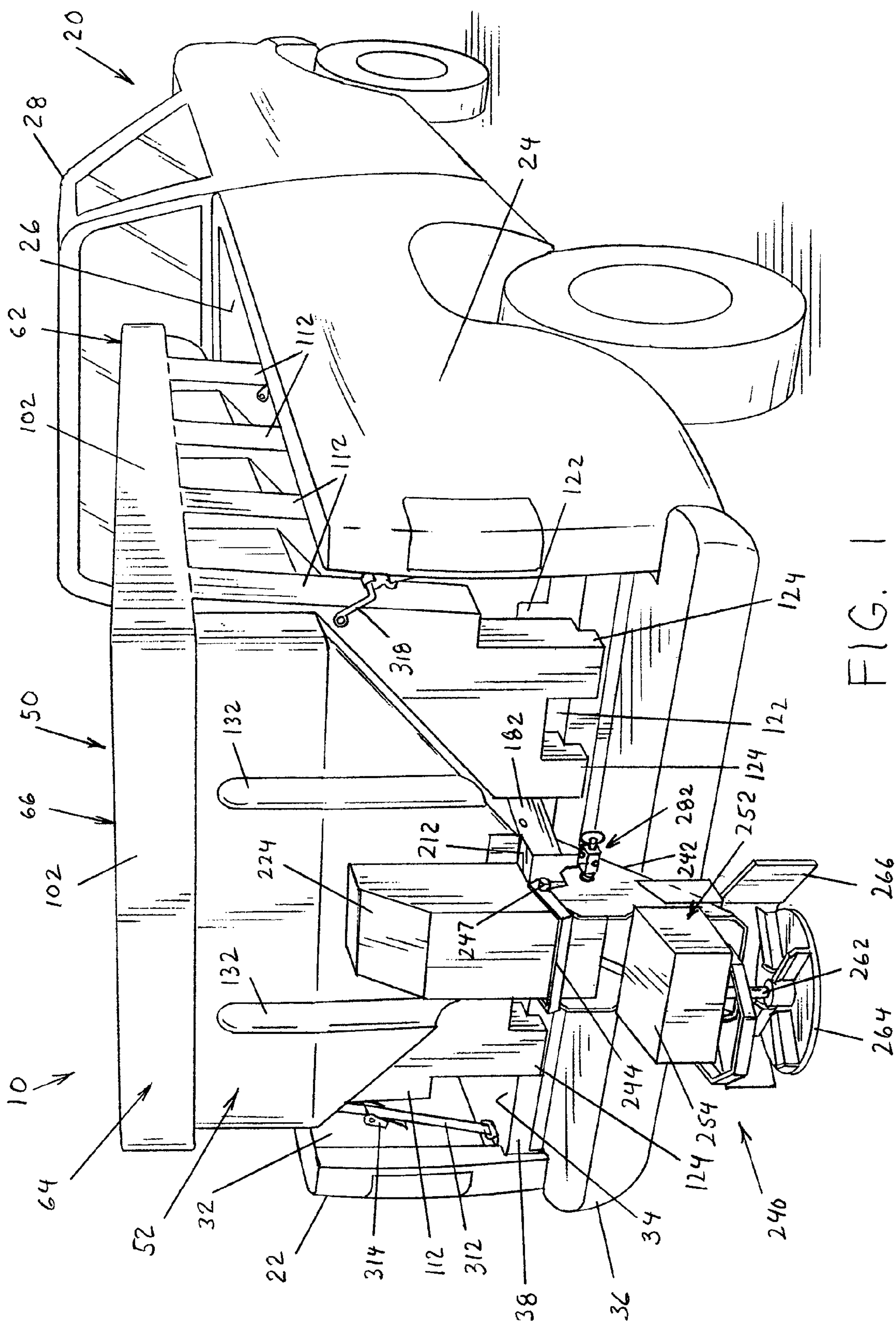
FIG. 1 is a perspective view of a spreader assembly according to one embodiment of the present invention, mounted within the bed of a pick-up truck.

Referring now to the drawings wherein the showings are for the purpose of illustrating a preferred embodiment of the invention only, and not for the purpose of limiting same, FIG. 1 shows a spreader apparatus 10 according to the present invention mounted within a vehicle having a flat cargo bed. In the embodiment shown, a conventional pick-up truck 20 is shown. As will be appreciated from a further reading of the following specification, spreader apparatus 10 may find advantageous application with any type of vehicle having a flat cargo bed at the rear thereof.

Figure 2:
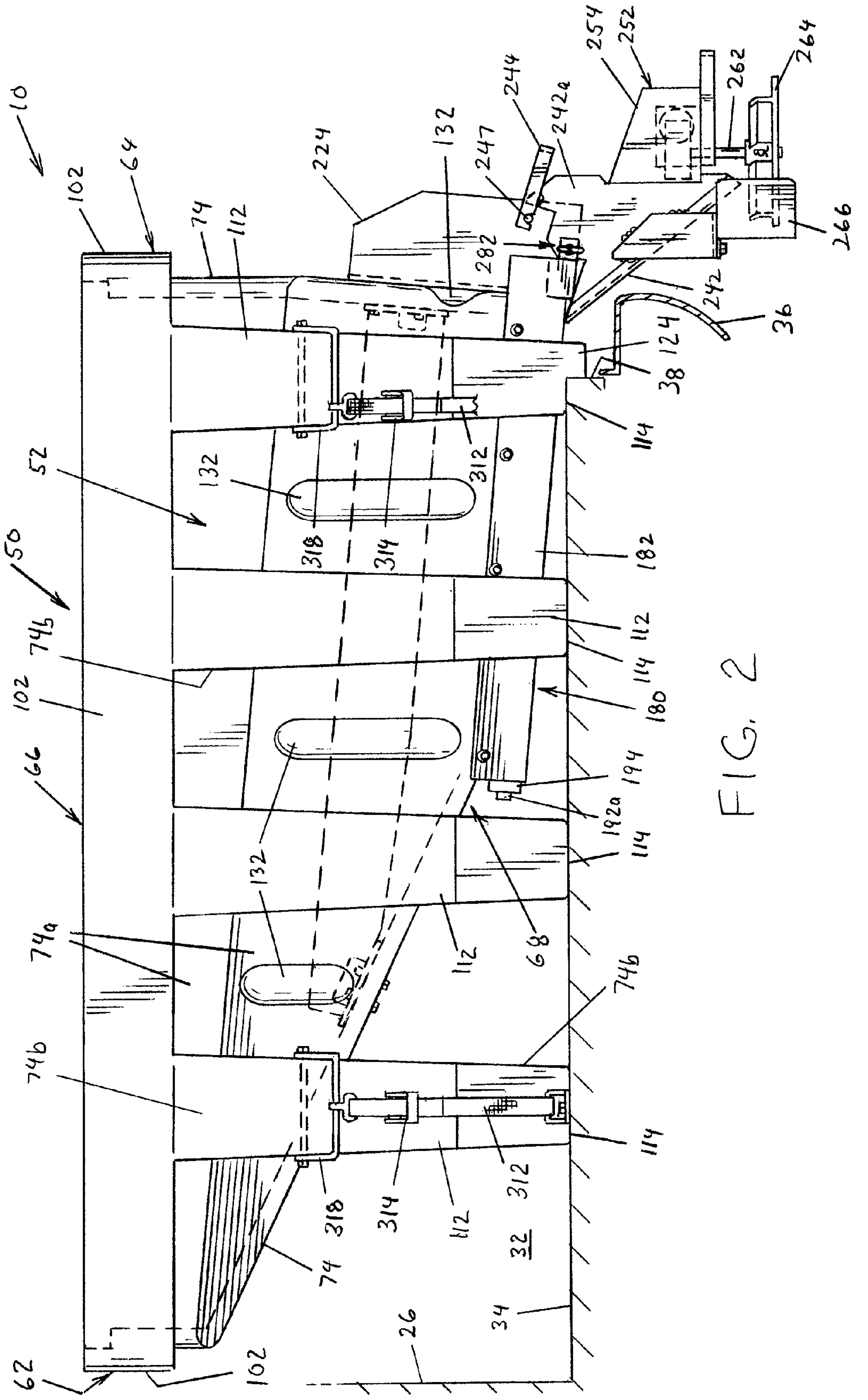
FIG. 2 is a side elevational view of the spreader assembly shown in FIG. 1.

Pick-up truck 20 includes two, spaced-apart side walls 22, 24 and an end wall 26 that is located behind the cab portion 28 of truck 20. A tailgate, typically found on conventional pick-up trucks, has preferably been removed and is not shown in the drawings. Side walls 22, 24 and end wall 26 together form a rectangular cargo box or storage opening 32 having a flat cargo bed 34 on the bottom thereof. Most pick-up trucks 20 of the type shown typically include a bumper 36 that is set below cargo bed 34 so as to define a step or ledge 38, as best seen in FIG. 2.

Spreader apparatus 10 is basically comprised of a hopper 50, a particulate conveyor system 180 mounted to hopper 50 and a spinner assembly.

Figure 3:
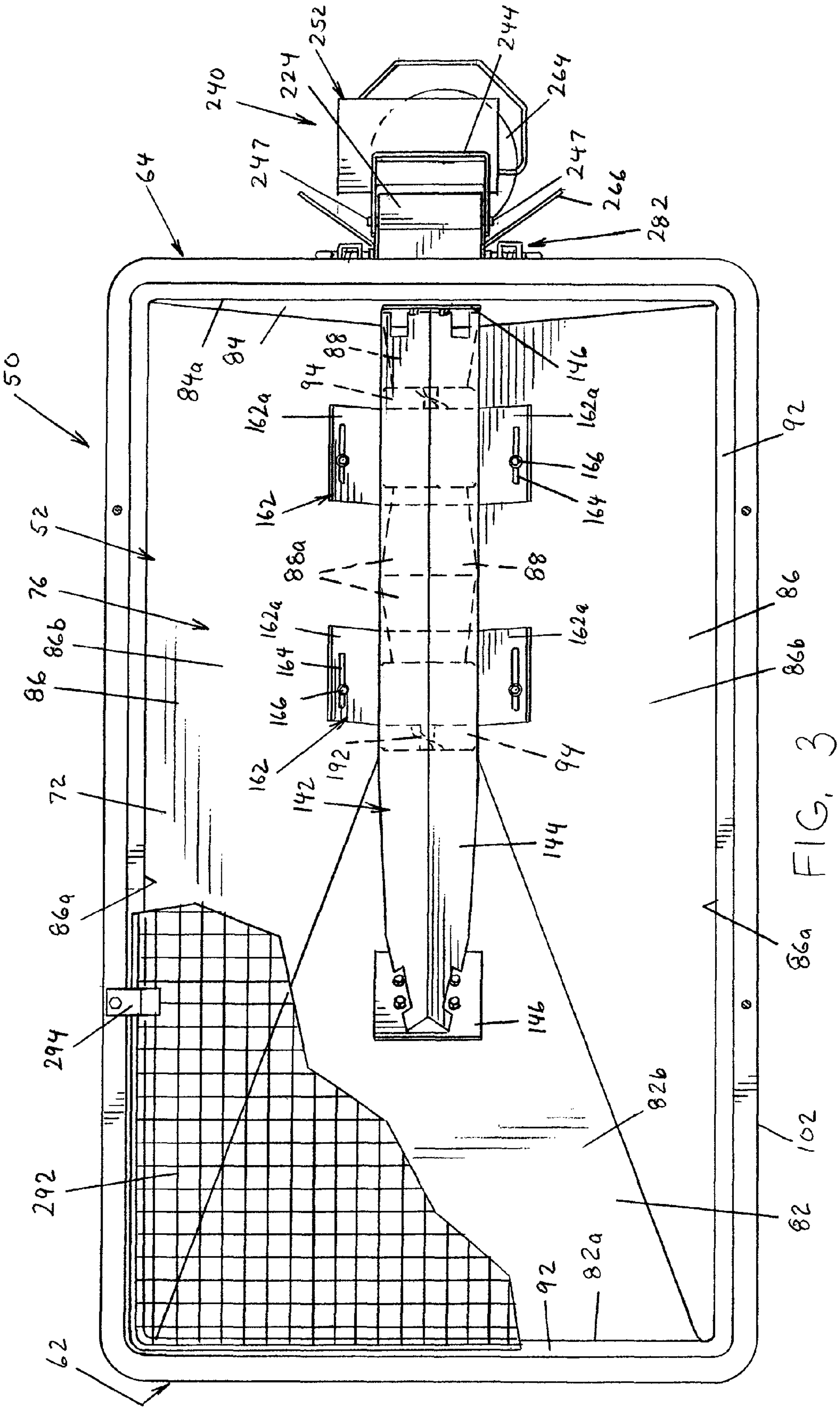
FIG. 3 is a top plan view of the spreader assembly.
Figure 6:
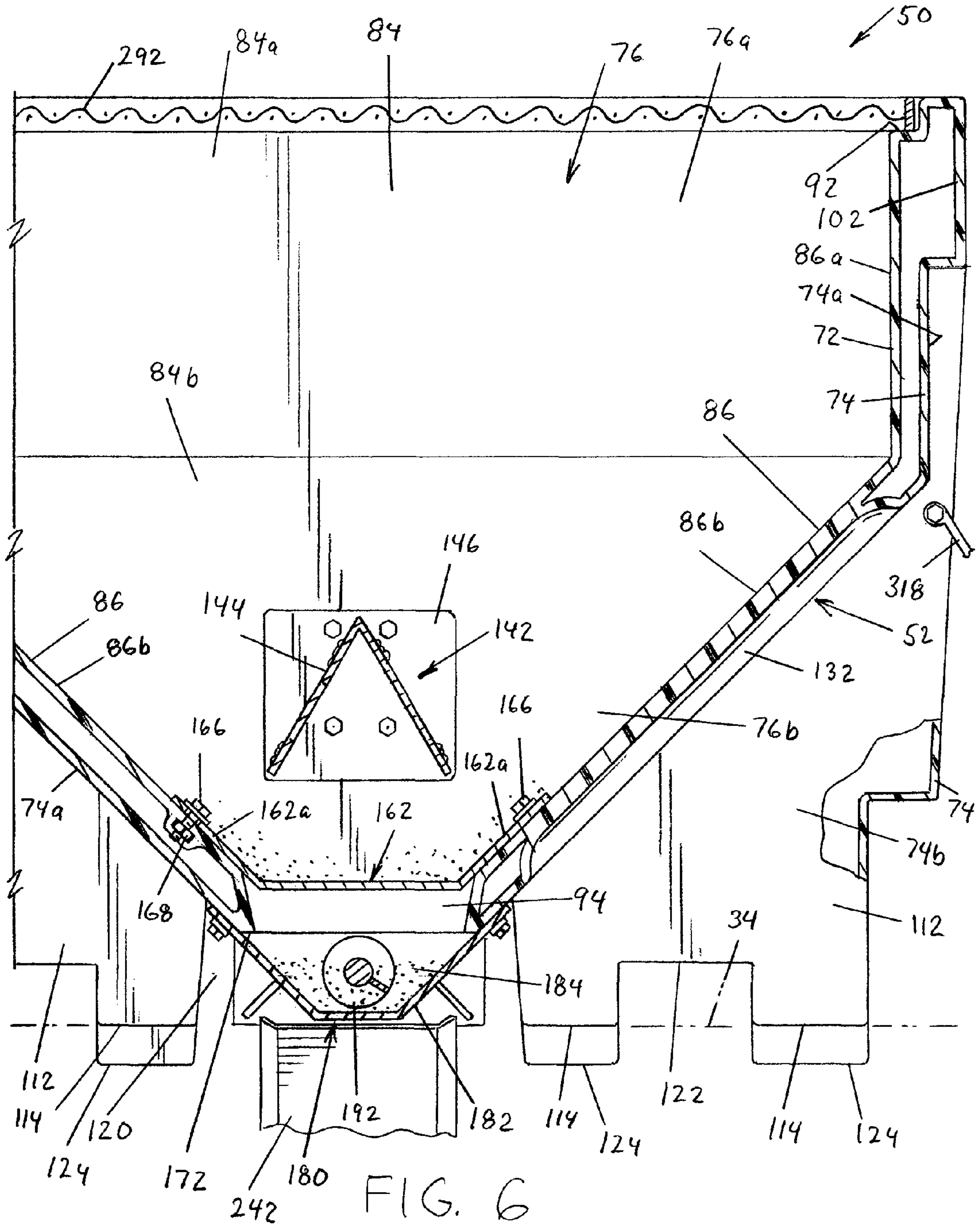
FIG. 6 is an enlarged, sectional view taken along lines 6-6 of FIG. 5.

Hopper 50 is a funnel-shaped structure having a bin portion 52 and a plurality of spaced-apart leg portions 112 that extend downwardly from bin portion 52. Hopper 50 has a front end 62, located near cab portion 28 of truck 20, a back end 64, located near the end of truck 20, an open upper end 66, and a closed lower end 68. In the embodiment shown, hopper 50 is a molded, double-walled structure having an inner wall 72 and an outer wall 74. Inner wall 72, best seen in FIG. 3, is formed to define a material-holding cavity 76. Inner wall 72 is formed such that cavity 76 has a rectangular upper region **76*a* and a funnel-shaped lower region 76*b*, best seen in FIGS. 3 and 6. Inner wall 72 has a front-end section 82, a back end section 84, opposing side sections 86 and a bottom section 88. Front-end wall section 82, back wall section 84, and side sections 86 have a generally vertical extent, designated 82*a*, 84*a*, and 86*a*, respectively, that define the rectangular upper region 76*a* of cavity 76. As best seen in FIG. 6, the upper edges of vertical extents 82*a*, 84*a*, 86*a* of the respective inner wall sections 82, 84, 86 are formed to define a step or ledge 92**.

Front-end section 82 and side sections 86 of inner wall 72 have sloping extents **82*b*, 86*b* that slope downwardly and inwardly toward bottom section 88 of inner wall 72. As best seen in FIG. 3, sloping extent 82*b* of front-end section 82 of inner wall 72 slopes from front end 62 of hopper 50 downwardly toward back end 64 of hopper 50. Sloping extents 86*b* of side sections 86 of inner wall 72 slope downwardly toward each other and toward bottom section 88. As best seen in FIG. 3, bottom section 88 of the inner wall is centrally located within hopper 50 and is disposed near the back end 64 of hopper 50**.

Figure 5:
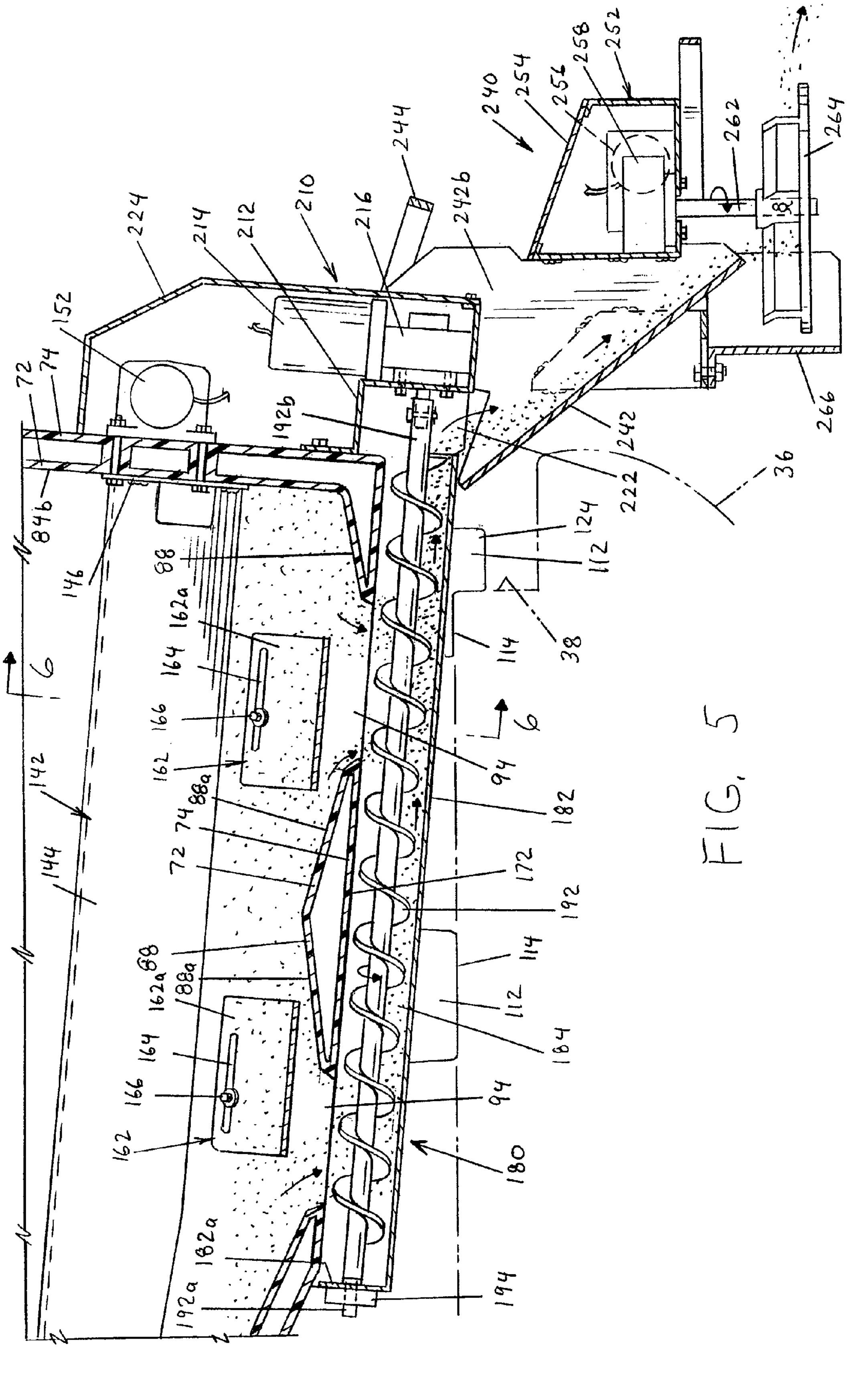
FIG. 5 is a sectional view of the spreader assembly.

In the embodiment shown, two, spaced-apart aligned openings 94 are formed in bottom section 88 of inner wall 72. As best seen in FIG. 5, bottom section 88 of inner wall 72 is formed wherein portions **88*a* thereof slope toward each opening 94. As shall be described in greater detail below, openings 94 define outlets for the media particulate within hopper 50 to flow from hopper 50**.

Referring now to the outer wall 74 of hopper 50, along the upper edge of hopper 50, outer wall 74 is formed to define an outwardly extending flange 102. Flange 102 is formed about the periphery of open upper end 66 of hopper 50. Certain portions **74*a* of outer wall 74 are formed to be parallel to the inner wall. These portions 74*a* of outer wall 74 define the general shape of bin portion 52 of hopper 50. Other portions 74*b* of outer wall 74 are formed to define leg portions 112 of hopper 50. In the embodiment shown, four (4) spaced-apart, columnar leg portions 112 are formed along each side of hopper 50. Leg portions 112 are generally rectangular in shape and extend dowpwardly from bin portion 52 of hopper 50. As best seen in FIG. 6, leg portions 112 extend downwardly beyond the lowermost portion of bin portion 52 such that outlet openings 94 in bin portion 52 are disposed a predetermined distance above cargo bed 34 of truck 20. In this respect, leg portions 112 preferably have planar bottom surfaces 114 for supporting hopper 50 on flat surfaces, such as cargo bed 34 of vehicle 20. As best seen in FIG. 6, leg portions 112 define an elongated channel 120 beneath bottom 172 of bin portion 52 of hopper 50. Channel 120 extends along bottom 172 of bin portion 52**.

Figure 4:
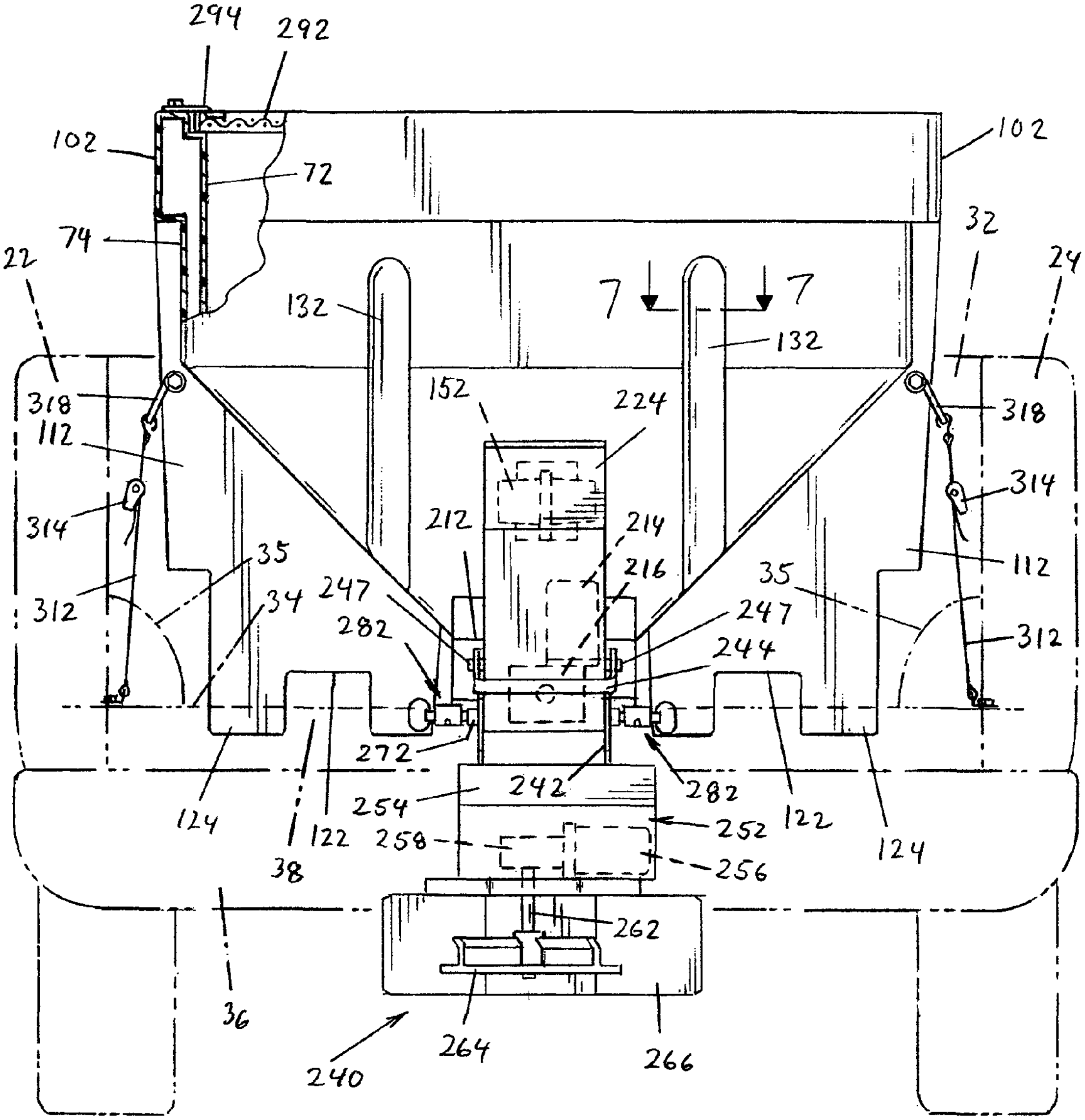
FIG. 4 is an end view showing the back end of the spreader assembly.

In the embodiment shown, the outward facing surfaces of leg portions 112 are notched at the lower ends thereof to accommodate wheel wells 35 of truck 20 that extend into storage opening 32 of truck 20, as best seen in FIG. 4. The bottom ends of legs portions 112 are formed to include a recess 122, as best seen in FIG. 4. Recesses 122 are dimensioned to receive the lifting blades of a conventional fork truck, as shall be discussed in greater detail below. Leg portions 112 at back end 64 of hopper 50 are formed to include downward extending fingers or tabs 124, best seen in FIGS. 4 and 5. Tabs 124 extend downward below bottom, flat surfaces 114 and define a positioning device to abut ledge 38 above bumper 36.

Figure 7:
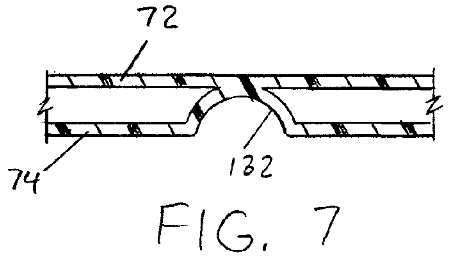
FIG. 7 is a sectional view taken along lines 7-7 of FIG. 4.

Portions of outer wall 74 that define bin portion 52 of hopper 50 are formed to engage and mold with inner wall 72, as best illustrated in FIG. 7. These portions of outer wall 74 define reinforcing ribs 132 that stiffen bin portion 52 of hopper 50. Reinforcing ribs 132 extend generally vertically and are formed in bin portion 52 between leg portions 112 and on back end 64 of hopper 50.

Referring now to FIGS. 3, 5 and 6, a deflector 142 is best seen. Deflector 142 is disposed within cavity 76 of hopper 50 and extends above bottom section 88 of inner wall 72 over outlet openings 94. As best seen in FIG. 6, deflector 142 is comprised of a V-shaped member 144 having flat plates 146 attached to the ends thereof. In a preferred embodiment, V-shaped member 144 and plates 146 are metal and are attached to each other by welding or brazing. One plate 146 is dimensioned to be attached to back-end section 84 of inner wall 72, and the other plate 146 is dimensioned to be attached to sloping extent **82*b* of front section 82 of inner wall 72. Conventional bolts extending through plates 146 and through inner and outer walls 72, 74 of hopper 50 attach one end of deflector 142 to the sloping extent 82*b* of hopper 50, as illustrated in phantom in FIG. 2. Conventional fasteners, i.e., bolts, extending through other plate 146 and inner and outer walls 72, 74 of back end 82 of hopper 50 attach the other end of deflector 142 to hopper 50 and to a vibrating device 152 on outer wall 74 of hopper 50, as best seen in FIG. 5**.

Gate elements 162, best seen in FIGS. 3 and 5, are attached to sloping extents **86*b* of side sections 86 of inner wall 72. Gate elements 162 are generally flat, rectangular plates having end portions 162*a* bent or formed to match the slope of sloping extents 86*b* of side sections 86** of inner wall

72. Elongated slots 164 are formed in end portions 162*a* of gates 162. Gates 162 are mounted to inner wall 72 of hopper 50 by conventional fasteners 166 threaded into inner wall 72. Preferably, fastening elements 168, such as nuts, are embedded in inner wall 72, as seen in FIG. 6, to receive fasteners 166 attaching gates 162 to the inner wall 72. Fasteners 166 extend through slots 164 in end portions 162*a* of gate elements 162 such that gate elements 162 are slidable along side sections 86 of inner wall 72.

As best seen in FIG. 5, bin section 52 is formed to define a flat, bottom surface 172 that is inclined relative to the flat cargo bed 34 of vehicle 20. Specifically, bottom surface 172 of bin portion 52 slopes downwardly from front end 62 of hopper 50 toward back end 64 of hopper 50. In the embodiment shown, bottom surface 172 of the bin portion 52 of hopper 50 slopes about 5° toward the back end 64 of hopper 50.

Referring now to FIGS. 5 and 6, particulate conveyor system 180 is best seen. In the embodiments shown in FIGS. 1-11, conveyor system 180 is comprised of a trough or tray 182 that is attached to sloping portion of outer wall 74 of bin portion 52. Trough or tray 182 defines a passage 184 beneath bin portion 52. As best seen in FIG. 5, passage 184 defined by trough or tray 182 communicates with outlet openings 94 in the bottom of bin portion 52 of hopper 50. In the embodiment shown, a helical auger 192 is disposed within passage 184 defined by trough 182. One end 192*a* of auger 192 extends through a back wall 182*a* of trough 182 and is mounted to a bearing 194. Another end 192*b* of auger 192 is attached to a drive assembly 210 that is mounted to a bracket 212 that is attached to outer wall 74 of hopper 50. Drive assembly 210 includes a drive motor 214 that is connected to a gear drive 216 that in turn is connected to end 192*b* of auger 192 to rotate the same. As best seen in FIG. 5, an opening 222 is defined between mounting bracket 212 and the end of trough 182. As shall be described in greater detail below, auger 192 is oriented to receive particulate material from outlets 94 in hopper 50 and direct the material toward discharge opening 222. As best seen in FIG. 5, a cover panel 224 is attachable to mounting bracket 212 and to hopper 50 to enclose the drive assembly 21 and vibrating device 152.

Figure 8:
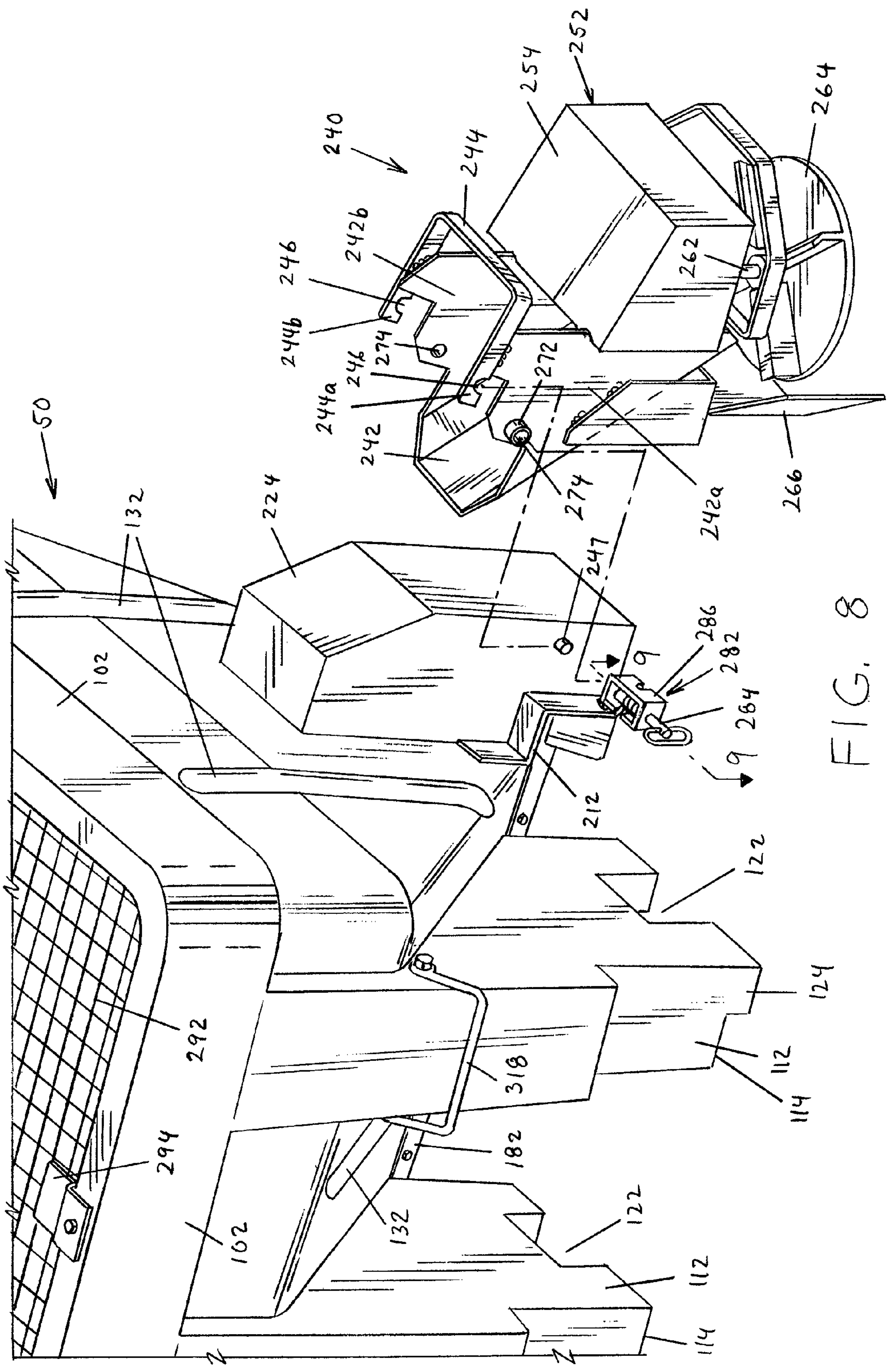
FIG. 8 is perspective view showing a chute and spinner assembly detached from the hopper portion of the spreader assembly.
Figure 9:
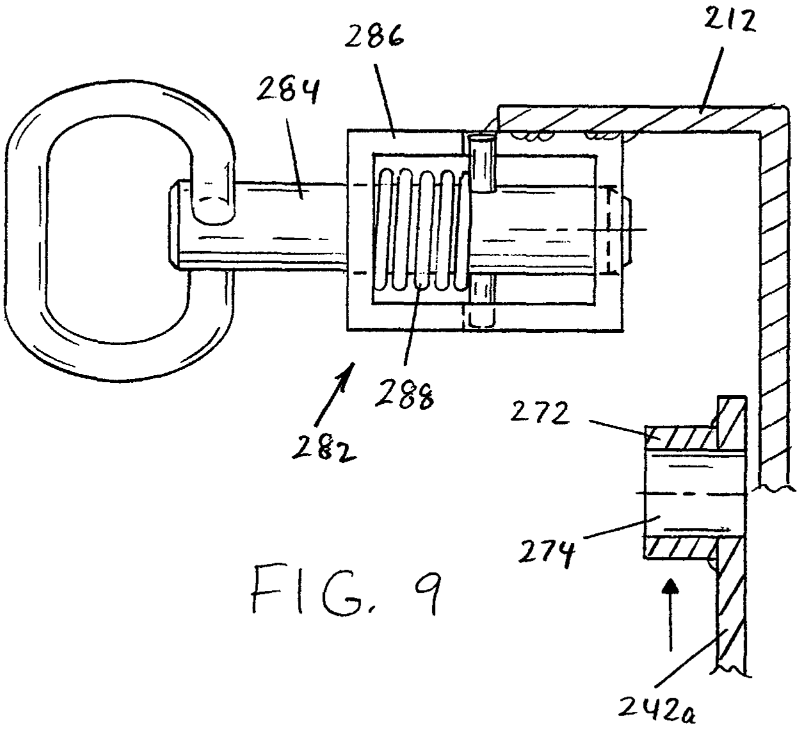
FIG. 9 is a partially-sectioned view taken along lines 9-9 of FIG. 8, showing a locking device for locking the chute and spinner device to the hopper and showing the locking device in an unlocked position.
Figure 10:
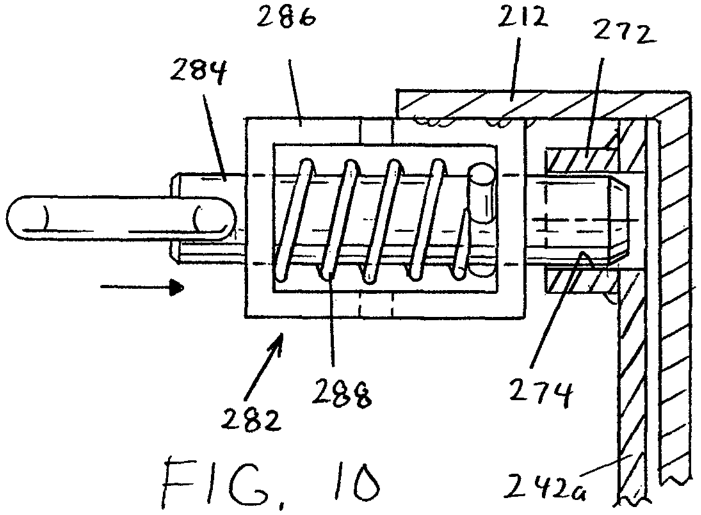
FIG. 10 is a view showing the locking device shown in FIG. 9 in a locking position capturing a portion of the spinner assembly.

Referring now to FIGS. 5 and 8, spinner assembly 240 is best shown. Spinner assembly 240 is comprised of a generally U-shaped chute 242 having parallel side panels 242*a*, 242*b*. A U-shaped reinforcing band 244 is secured to the upper portions of side panels 242*a*, 242*b* of chute 242. Reinforcing band 244 is forced to have free-arm portions 244*a*, 244*b* having downward facing notches 246 formed therein. A housing 252 having a removable panel 254 is attached to side panels 242*a*, 242*b* of chute 242. Housing 252 is dimensioned to enclose a drive motor 256 and a gear reducer 258. Gear reducer 258 has a downward, vertically oriented shaft 262 that extends below housing 252. A broadcast device, i.e., a spinner plate 264, is attached to the lower end of shaft 262. Motor shaft 262 and spinner 264 are disposed beneath the lower end of chute 242 so as to receive particulate material therefrom. As best seen in FIG. 5, spinner plate 264 is disposed adjacent a deflector shield 266. As best seen in FIG. 8, short pipe sections 272 are mounted to side panels 242*a*, 242*b* of chute 242, preferably by welding. These pipe sections 272 define sockets 274 in side panels 242*a*, 242*b*, as best seen in FIGS. 9 and 10. Notches 246 in reinforcing band 244 are dimensioned to be attached to outwardly extending pins 247 on cover 224 on back end 64 of hopper 50, as best seen in FIG. 8. Spinner assembly 240 is dimensioned to be attached to hopper 50 by attaching notches 246 in band 244 onto pins 247 on cover 224. A locking device 282, best seen in FIGS. 9 and 10, comprised of a locking pin 284, mounted within a rectangular housing 286 is attached to bracket 212 on back end 64 of hopper 50. Locking pin 284 is biased by a spring 288 toward cover 224. In this respect, when spinner assembly 240 is mounted to cover 224 on hopper 50, the locking pin 284 may be disengaged from its enclosure and inserted into socket 274 on pipe section 272 on side panels 242*a*, 242*b* of chute 242 so as to lock spinner assembly 240 onto hopper 50, as illustrated in FIG. 10.

A screen 292 is provided to be disposed within opened upper end 66 of hopper 50. In this respect, screen 292 is dimensioned to rest upon step 92 defined by the upper end of hopper 50. Clips 294, best seen in FIG. 8, attach to flange 102 of hopper 50 by conventional fasteners to secure screen 292 to hopper 50.

Hopper 50, i.e., bin portion 52 and leg portion 112, as heretofore described, is formed as an integral structure, and is comprised of a tough, durable polymer material. Hopper 50 may be formed of a thermoset or thermopolymer material. Hopper 50 is preferably formed of a thermopolymer or filled thermopolymer, such as by way of example and not limitation, polyolefin, nylon or Acrylonitrile Butadiene Styrene (ABS). In one embodiment of the present invention, hopper 50 is formed of low density polyethylene. Hopper 50 may be formed by any conventional polymer molding process, but in a preferred embodiment, is formed by a spin-casting process.

The present invention shall now be further described with respect to the operation of apparatus 10. As best illustrated in FIG. 4, apparatus 10 is preferably inserted within cargo bed 34 of a pick-up truck 20, or other similar vehicle. Recesses 122 formed in leg portions 112 are dimensioned to receive the blades of a conventional fork truck to enable the entire hopper assembly 10 (without spreader assembly 240 attached thereto) to be lifted by a fork truck and placed onto cargo bed 34 of pick-up truck 20. (As will be appreciated, spreader assembly 240 is preferably detached from hopper 50, when hopper 50 is being placed onto truck 20 or removed therefrom.) Hopper 50 is mounted to cargo bed 34 by conventionally known straps 312 and ratchets 314, as best seen in FIGS. 1 and 4. A hook, on the straps 312, can be attached to rings 318 mounted to leg portions 112 of hopper 50 assembly, and the bottom of strap 312 is attached to cargo bed 34 of truck 20 by conventional fasteners. Tightening straps 312, using ratchets 314, secures hopper 50 to cargo bed 34 of truck 20. As best seen in FIGS. 4 and 5, downward extending tab 124 is used to position hopper 50 within cargo bed 34 of the pick-up 20. In this respect, downward extending tabs 124 on leg portions 112 act as locating devices to locate hopper 50 in cargo bed 34 of truck 20.

With hopper 50 positioned and secured within storage opening 32 of pick-up 20, the particulate to be spread, such as by way of example and not limitation, salt or sand, may be placed in hopper 50. Screen 292 attached to hopper 50 prevents large clumps of the particulate from entering into hopper 50.

Spinner drive motor 256 and the auger drive motor 214 may be operated independently when it is desired to dispense the particulate. Vibrating device 152 may also be operated independently to vibrate hopper 50 and deflector 142 to facilitate feeding of the particulate to openings 94 in hopper 50. In this respect, the smooth-molded walls of hopper 50, being integrally formed of a polymer material, have no seams or locations where a particulate may become embedded to resist the flow thereof to the openings. Particulate falling through openings 94 in hopper 50 is conveyed by auger 192 to spinner assembly 240 where it is spun onto the surface to be treated. The slight incline of auger 192 from front to back facilitates the flow of the particulate to spinner assembly 240. Moreover, having the conveyor device beneath hopper 50 removes the excessive weight of the particulate from the conveying device, i.e., auger 192, thereby reducing the likelihood of binding or jamming of auger 192.

The present invention thus provides a spreader apparatus 10 for use in a flat bed of a vehicle, which apparatus 10 has an improved hopper 50 and a particulate conveyor system disposed beneath hopper 50 for conveying particulates from hopper 50 to a spinner assembly 240. By being integrally formed of a polymer material, and by having a double-walled construction with reinforcing ribs, hopper 50 provides a rigid, durable structure that will not rust or corrode from exposure to harsh winter climates and corrosive materials, and that can likewise support a considerable load of particulate material; and further provides a structure that is less susceptible to abrasion from particulate material. Moreover, by placing the particulate conveyor system below, i.e., outside hopper 50, entire weight of the particulate material does not rest upon the conveyor device, and therefore, the particulate conveyor system is less susceptible to jamming or stalling.

Figure 11:
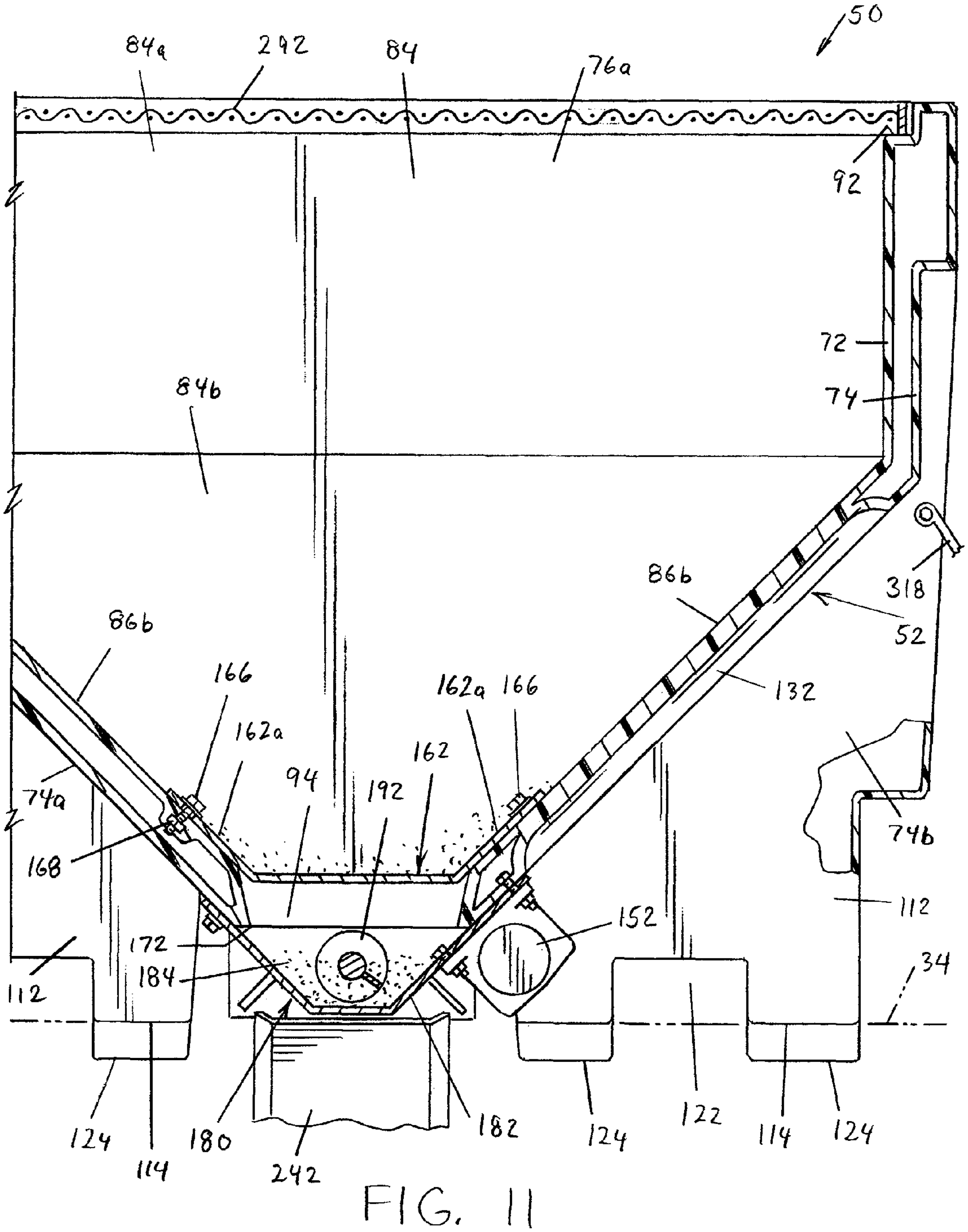
FIG. 11 is a sectional view similar to FIG. 6, illustrating another embodiment of the present invention.

Referring now to FIG. 11, an alternate embodiment of the present invention is shown. FIG. 11 shows a hopper 50 as heretofore described with respect to FIGS. 1-10. In FIG. 11, deflector 142 has been eliminated and vibrating device 152 has been relocated from back end 64 of hopper 50 to the underside of hopper 50, wherein a portion of vibrating device 152 is secured to tray or trough 182 and a portion is mounted to the underside of hopper 50. In this location, vibrating device 152 vibrates both trough 182 and hopper 50 in the vicinity of openings 94, thus facilitating the flow of the particulate to hopper 50 to and through conveying system 180, i.e., auger 192. In addition, locating vibrating device 152 beneath hopper 50 reduces the profile of housing cover 224 at back end 64 of hopper 50. In this position, vibrating device 152 is beneath hopper 50, in an out-of-the way position located near openings 94 in hopper 50.

Figure 12:
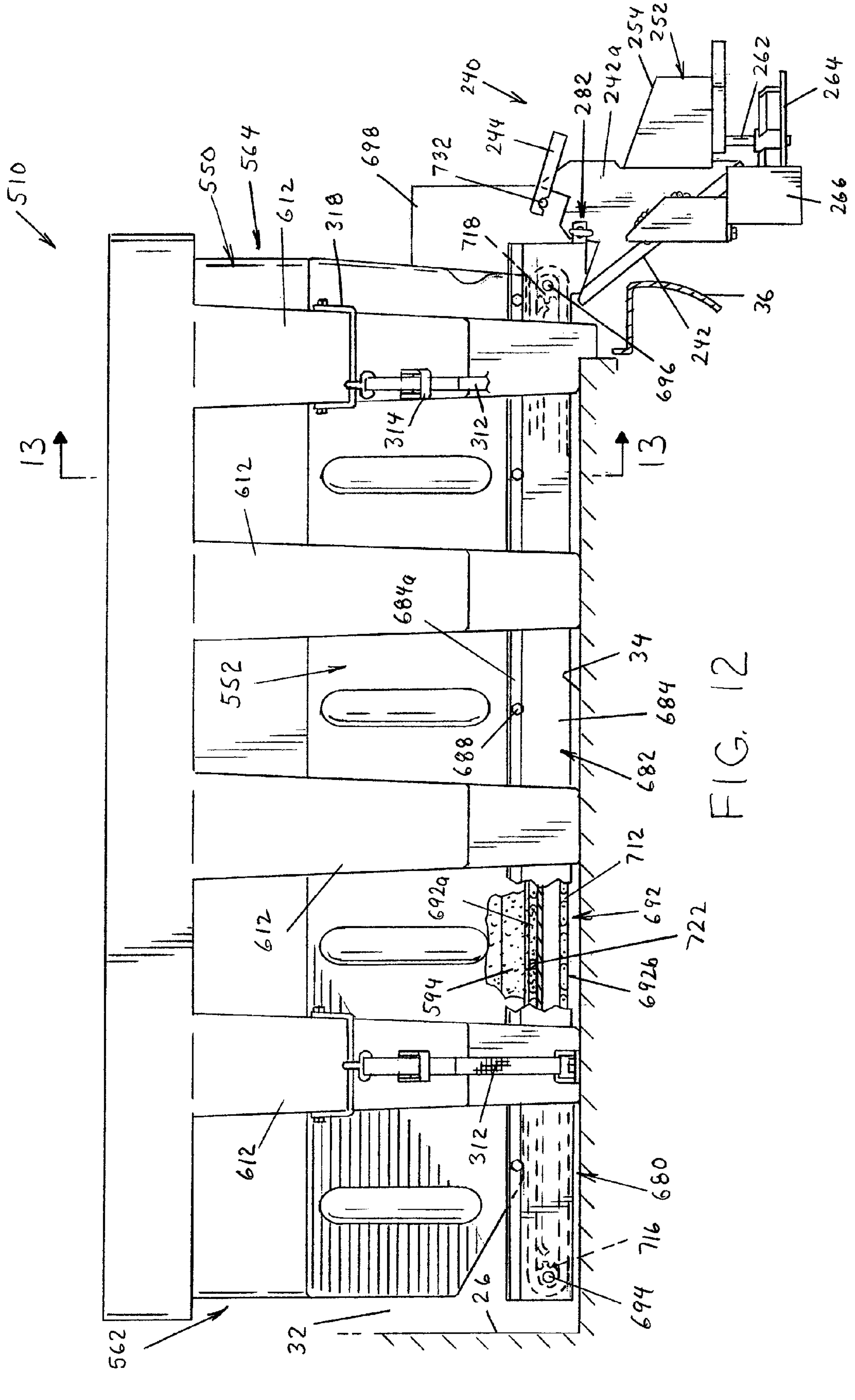
FIG. 12 is a sectioned, side elevational view of a spreader assembly illustrating another embodiment of the present invention.
Figure 13:
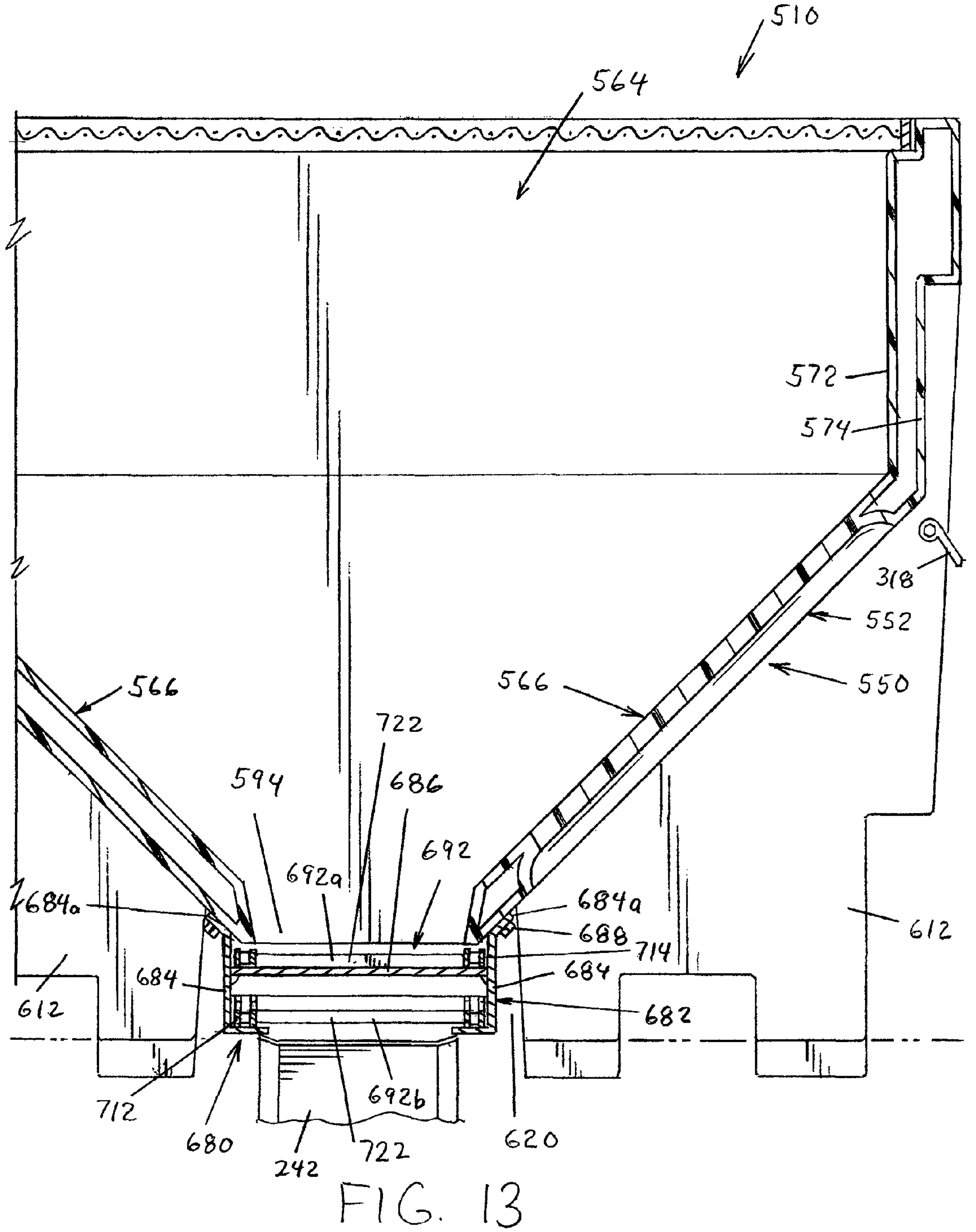
FIG. 13 is a sectional view taken along lines 13-13 of FIG. 12.

Referring now to FIGS. 12 and 13, another embodiment of the present invention is shown. Heretofore, the embodiments illustrated showed a particulate conveying system 180 comprised of auger 192 within a trough 182. FIGS. 12 and 13 show a spreader apparatus 510 having a hopper 550 and a conveyor system 680 disposed beneath hopper 550. Hopper 550 is an integrally formed, double-walled structure, similar to previously described hopper 50. In this respect, hopper 550 is formed of a polymer material and has a bin portion 552 and spaced apart leg portions 612. Hopper 550 has inner and outer walls 572, 574, respectively, that define bin portion 552 and leg portions 612. Hopper 550 is similar in many respect to hopper 50 and includes many similar features as heretofore described with respect to hopper 50, as will be appreciated by those skilled in the art from a review of FIGS. 12 and 13. The main difference between hopper 550 and hopper 50 is that hopper 550 is modified to eliminate the large, sloping front end 62 of hopper 50. In this respect, the front and back sections 562, 564 of inner wall 572 of hopper 550 are more vertical, and only side section 566 of inner wall 572 of hopper 550 slope inwardly toward a plurality of openings 594 located along the bottom of hopper 550. Leg portions 612 define an opening or channel 620 beneath hopper 550.

Particulate conveyor system 680 is disposed beneath hopper 550 within channel 620 defined between leg portions 612. Particulate conveyor system 680 includes an elongated housing 682 comprised of spaced-apart side panels 684 connected by a horizontal plate 686 that extends the length of housing 682. Side panels 684 include bent edge portions 684*a*. Housing 682 is attached to the bottom of hopper 550 by means of fasteners 688 extending through edge portions 684*a* of side panels 684 into bin portion 552, as best seen in FIG. 13.

Particulate conveyor system 680 also includes a generally endless conveyor belt 692 that is disposed within housing 682. Conveyor belt 692 has an upper belt run 692*a* and a lower belt run 692*b*. Conveyor belt 692 is disposed within housing 682 such that upper belt run 692*a* moves along plate 686 beneath openings 594 in hopper 550. Conveyor belt 692 is mounted on shafts 694, 696 at the distal ends of housing 682. Shaft 696 at the back end 564 of hopper 550 is driven by a motor (not shown) contained with a housing 698 mounted to back end 564 of hopper 550.

In the embodiment shown, conveyor belt 692 is comprised of spaced-apart sprocket chains 712, 714 that are driven by sprockets 716,718 on shafts 694, 696. Sprocket chains 712, 714 are connected by transverse bars 722, as best seen in FIG. 13, that are movable with chains 712, 714. A conventional conveyor belt formed of a polymer material having upward extending walls or fingers is also contemplated.

A locking device 282, as previously described, is mounted at the end of housing 682, and a mounting pin 732 is mounted to housing 698 to facilitate a spreader assembly 240, as previously described, to be mounted to hopper 550.

Referring now to the operation of spreader apparatus 510, particulate material in hopper 550 flows through openings 594 in the bottom of hopper 550 onto horizontal plate 686. Conveyor belt 692 is driven in a direction wherein transverse bars 722 move across the upper surface of horizontal plate 686 and drag particulate material across horizontal plate 686. The particulate material is dragged to the end of conveyor system 680 wherein it falls onto chute 242 of spreader assembly 240 to be distributed by spinner 264.

Spreader apparatus 510 illustrates how different types of conveyor systems may be used with an integrally molded hopper according to the present invention.

The foregoing descriptions are of specific embodiments of the present invention. It should be appreciated that these embodiments are described for purposes of illustration only and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A material spreading apparatus for mounting in a cargo bay of a truck, said apparatus comprising:

a molded hopper having a front end and a back end, said hopper having longitudinally extending inner sides that slope downwardly toward a longitudinally extending opening in the bottom of said hopper and longitudinally extending outer sides that slope downwardly toward the bottom of said hopper, said hopper further comprising downwardly extending, columnar, and hollow leg portions for removably supporting said hopper on a bed of the cargo bay such that the opening will be disposed above the bed of the cargo bay, said leg portions being longitudinally spaced apart along respective outer sides of the hopper and being unitary with respective outer sides of said hopper;

an elongated conveyor device extending along said bottom of said hopper beneath said opening for conveying particulates from said opening toward said back end of said hopper;

a spinner assembly attached to said hopper at said back end disposed to receive particulates from said hopper for throwing the particulates over a distribution area;

wherein said hopper is molded from a polymer material and has an inner wall spaced from an outer wall to form a double-walled unitary structure, the inner wall forming said inner sides and said outer wall forming said outer sides and hollow leg portions, and wherein the hollow legs protrude laterally outwardly from the outer sides.

2. A material spreading apparatus as defined in claim 1, wherein said conveyor device extends from said front end of said hopper to said back end of said hopper and is centrally located in relation to the inner sides of the hopper.

3. A material spreading apparatus as defined in claim 1, wherein said conveyor device is inclined downwardly toward said back end of said hopper.

4. A material spreading apparatus as defined in claim 1, wherein said conveyor device is an auger.

5. A material spreading apparatus as defined in claim 1, wherein said conveyor device is a conveyor belt.

6. A material spreading apparatus as defined in claim 1, further comprising: a trough extending longitudinally along the bottom of said hopper and beneath said opening, said trough defining an elongated passage that is in communication with said opening and extends toward said back end of said hopper;

and an auger within said passage for conveying particulates in said hopper from said opening and along said trough to said back end of said hopper.

7. A material spreading apparatus as defined in claim 1, wherein said hopper is rotationally molded.

8. A material spreading apparatus as defined in claim 1, wherein said opening includes a plurality of opening segments longitudinally spaced along the bottom of said hopper.

9. A material spreading apparatus as defined in claim 1, further comprising a movable gate member disposed in said hopper above said opening.

10. A material spreading apparatus as defined in claim 1, further comprising an elongated deflector within said hopper extending along the length of said hopper and disposed above said opening.

11. A material spreading apparatus as defined in claim 10, further comprising a vibrating element attached to deflector.

12. A material spreading apparatus as defined in claim 11, wherein said deflector is a V-shaped plate.

13. A material spreading apparatus as defined in claim 1, wherein said columnar leg portions are generally rectangular in cross-section.

14. A material spreading apparatus as defined in claim 1, further comprising on each outer side of the hopper a pair of rings respectively attached to opposite sides of a respective leg portion for attaching said hopper to said vehicle.

15. A material spreading apparatus as defined in claim 1, wherein said leg portions are tapered along the vertical height thereof.

16. A material spreading apparatus as defined in claim 1, wherein at least one of said leg portions has in the lower end face thereof a downwardly opening recess bounded by vertical walls.

* * * * *